United States Patent [19]
Krauss

[11] 3,885,606
[45] May 27, 1975

[54] MOVEABLE LOADING APPARATUS FOR FINE GRANULAR AND PULVERIZED LOOSE SOLIDS

[75] Inventor: Werner Krauss, Hamburg, Germany

[73] Assignee: Claudius Peters A G., Hamburg, Germany

[22] Filed: Feb. 1, 1973

[21] Appl. No.: 328,620

[30] Foreign Application Priority Data
Feb. 4, 1972  Germany............................ 2205203

[52] U.S. Cl. .................... 141/71; 55/434; 141/198; 141/286; 214/17 R; 302/59
[51] Int. Cl. ........................... B65b 1/20; B65b 1/22
[58] Field of Search ............... 55/434, 442; 138/37; 214/16 R, 17 R, 17 C; 222/190; 302/59; 141/4, 5, 12, 67, 68, 71–74, 78, 205, 284, 286, 198, 44, 231, 232

[56] References Cited
UNITED STATES PATENTS

| | | | |
|---|---|---|---|
| 261,941 | 8/1882 | McCrodden ..................... | 141/72 X |
| 2,809,871 | 10/1957 | Arden .................................. | 302/59 |
| 2,862,771 | 12/1958 | Lebeis, Jr. ........................... | 302/59 |
| 3,348,589 | 10/1967 | Krauss ................................ | 141/284 |
| 3,595,280 | 7/1971 | Fissel .............................. | 141/198 X |

FOREIGN PATENTS OR APPLICATIONS

| | | | |
|---|---|---|---|
| 1,405,937 | 6/1965 | France .............................. | 141/286 |
| 867,519 | 7/1949 | Germany ........................... | 141/286 |
| 937,699 | 1/1956 | Germany ........................... | 141/286 |
| 342,326 | 10/1922 | Germany ........................... | 141/286 |

*Primary Examiner*—Houston S. Bell, Jr.
*Assistant Examiner*—Frederick R. Schmidt
*Attorney, Agent, or Firm*—Frederic C. Dreyer

[57] ABSTRACT

A reciprocable, enclosed hopper for service between a fixed feedspout and subjacent, non-fixed, tank-truck inlets. Included are sloping bottom walls in the hopper adjacent the outlet and a plurality of internal deflecting-baffles arranged on fixed or changeable slopes to cause multiple changes in the direction of travel and de-aeration of the solids passing through the enclosed hopper. A vibrator may be associated with the hopper bottom-walls to assist material flow.

10 Claims, 2 Drawing Figures

MOVEABLE LOADING APPARATUS FOR FINE GRANULAR AND PULVERIZED LOOSE SOLIDS

BACKGROUND OF THE INVENTION

The invention is concerned with the loading or filling of upwardly opening vessels which are variable in position in at least a horizontal direction (typically tank trucks) with loose, solid materials received from a stationary supply point or spout. A moveable hopper is positioned beneath the fixed supply spout and is extensible along the path of the variable-position tanks. The bottom walls of the hopper slope downward to an outlet opening, while the upper portion of the hopper is closed to the atmosphere.

BRIEF DESCRIPTION OF THE PRIOR ART

Prior units of this type are know in which a hopper having a V-shaped or conical delivery surface is arranged with an angle of declination of about 50° from the horizontal. One such unit involves a relatively great building height or vertical dimension and, because of its size, is moveable only over a short distance of travel. When the moveable loading hopper is restricted to a smaller size, the incoming material flows without delay or diversion from the inlet too quickly to the outlet.

In the handling of light, fine-granular and dusty or pulverulent loose-solids, they are usually fed to the loading hopper by means of pneumatic conveyors, such as fluidizing conveyors. In consequence of such stark or extreme aeration of the loose solids, reliable or adequate de-aeration will not occur during loading operation with the known loading hoppers.

De-aeration is critical, however, in order to exploit the full volume of the vessels to be loaded, such as tank trucks, to their greatest capacity for the loose-solids being loaded. Adequate de-aeration of the loose solids is even more certainly made impossible when it experiences a direct or vertical flowpath between the stationary fillspout and the outlet-opening of known loading hoppers.

An effective prior unit is described in my prior U.S. Pat. No. 3,348,589 in which the moveable hopper has pneumatic conveying troughs forming the discharge surfaces leading to the outlet opening. The material supplied from the feed spout is fluidized on the conveying troughs and delivered to the outlet. Dust removal and venting is effected by vent pipes provided on the feedspout.

This prior unit is effective for large ranges of movement, (e.g., 10 yards) since the required slope of the conveying surfaces is very small. However, a difficulty is encountered when non-fluidizable or poorly-aerating materials are to be loaded.

In low profile, moveable loading units which use conveyor screws, especially when used with the difficult materials set forth above, a particularly poor escape of air is experienced.

SUMMARY OF THE INVENTION

The present invention is concerned with mobile loading apparatus for granular and pulverulent loose solids and is more particularly concerned with the greatest possible de-aeration of such materials when they are received from pneumatic conveyors and, consequently, are highly aerated and have a substantial amount of trapped-air.

The present invention solves the problem by positioning several baffles within the hopper of the mobile loading unit, which baffles are arranged on a plane intersecting the plane of the bottom sheets of the hopper. Also, external vibrators may be applied to the bottom sheets.

The internal baffles effect an extension of the de-aerating path of the material. This extended de-aeration is encountered at every position of the mobile hopper, so that the incoming solids can never flow to the outlet without deflection or detour about the baffles and consequent de-aeration.

Vibrators can be applied to the exterior of the hopper to augment the de-aeration effect. The motion of the vibrators may be carried to the internal baffles, as well as to the slope sheets. With the application of such vibrators, the angle of the slope sheets can be reduced toward the horizontal, without fear of hangup of the loose material. Consequently, the overall height of the loading apparatus can be reduced.

It is to be understood that the vibrators may be employed only periodically, according to the characteristics of the material to be handled. In this case the vibrator serves as an auxiliary unit.

It is further to be understood that the baffles of the invention can be fixed and/or swingable on an axis and adjustable in slope from the exterior of the hopper. This adjustability of angle accomodates the differing properties of various loose solids.

It should be noted that the baffles may be arranged in inverted-V, roof-like pairs of equal or differing sidewall lengths. Also, one or more of the above baffle arrangements may be used in the same hopper.

The invention includes a further element in that the closure of the outlet of the hopper is accomplished by means of an electro-pneumatic, quick-cutoff valve. The quick-cutoff valve is of especial advantage in the particular arrangement. of slopesheets and baffles of the invention, especially when material is received from pneumatic conveying troughs. Preferably, the control signal for the cutoff valve is received from an otherwise known pneumatic sensor. The monitoring of the material level with such a pneumatic sensor, in combination with the quick cutoff valve, permits optimum filling of the tank trucks without danger of overflow.

The vent for removal of air, present in the hopper as a result of material de-aeration, does not form a part of the present invention. Suitable vents are known in the aforementioned U.S. Pat. No. 3,348,589, which also discloses suitable means for closing the upper portion of the hopper to the free atmosphere. German Gebranchusmuster-Anmelding G 72 00 273.4 includes a suitable alternate.

BRIEF DESCRIPTION OF THE DRAWINGS

A better understanding of the invention may be derived from the following description and the accompanying drawings in which.

DESCRIPTION OF THE PREFERRED EMBODIMENTS

Figure 1:
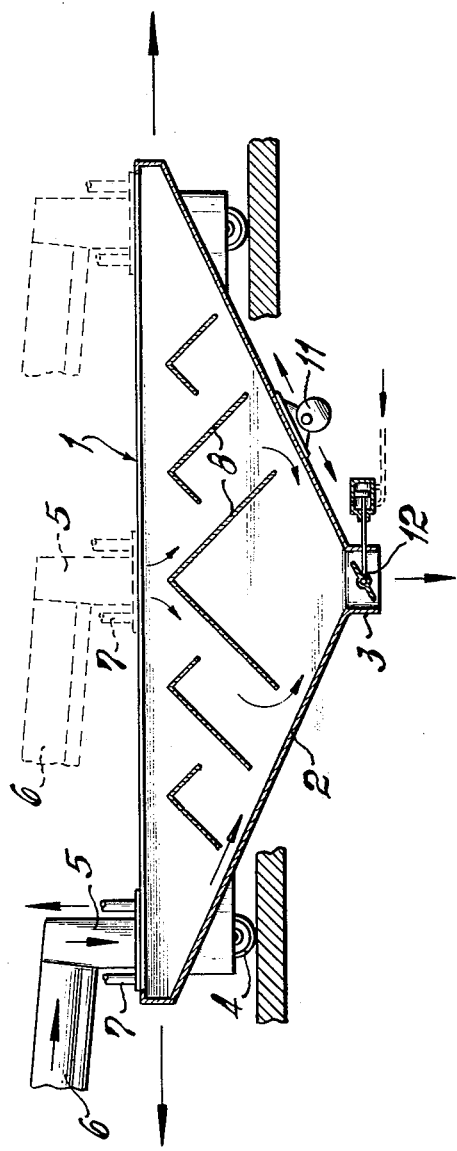
FIG. 1 is a schematic, sectional view of the preferred form of the invention.
Figure 2:
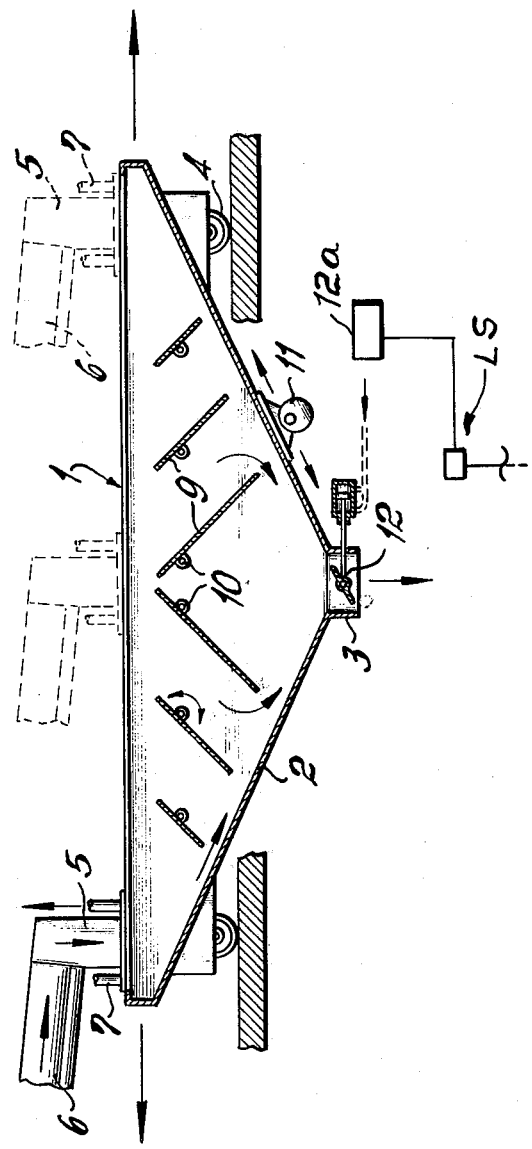
FIG. 2 is a schematic, sectional view of a different embodiment of baffle plate of the invention.

Both FIGS. 1 and 2 show the fundamentals of the loading apparatus of the invention. These include a closed, V-shaped trough or hopper 1 whose downwardly sloping bottom sheets or slope-sheets 2 lead to an outlet 3. The hopper is moveably mounted on rollers 4. The filling spout 5, which is stationary, receives material from a suitable supply-conveyor, shown here as a fluidizing conveyor 6. Vent pipes 7 serve for the escape of air from the loading hopper 1.

In both figures, the moveable hoppers 1 are shown at the extreme position (right hand end) of their range of travel. The dotted representations show the relationship of the stationary filling spout 5 and conveyor 6 in relation to the traversing outlet both in an intermediate and in an extreme of motion of the moveable hopper 1 in the opposite direction.

In the embodiment of FIG. 1, the hopper 1 is provided with a plurality of roof-like baffles 8, the sides of which are at an angle intersecting the plane of the adjacent slope sheets 2. Depending on the particular position at which the baffles occur in the moveable hopper, the respective sides of the baffles may have equal lengths or differing lengths. The roof-like baffles 8 are suitably secured to the upright sidewalls of the hopper 1.

In the operation of the embodiment of FIG. 1, the loose solid material supplied through the stationary filling spout 5 will encounter, according to the position of the hopper 1, one or both sidewalls or sides of a roof-like baffle 8 and therefore will be retarded or deflected and de-aerated. In most cases, the flow-direction subsequently will be further diverted or reversed, before the loose solids reach the outlet 3.

In the embodiment of FIG. 2 a plurality of baffles 9 are moveably mounted on axles 10. The axles 10 are extended through the vertical sidewalls of the moveable loading trough, so that the slopes of the baffles 9 can be controlled from the exterior of the trough. The regulation of the angle of slope of the baffles may be accomplished either manually or by suitable controlling apparatus.

As shown in both FIGS. 1 and 2, a vibrator 11 is attached to the outer surface of one of the slope sheets 2. It is to be understood that similar vibrator also may be arranged on the other slope sheet. Furthermore, vibrators with electromagnetic drives may be used as well as those shown, which work on the principle of imbalance.

The outlet 3 of the moveable loading trough 1 is provided with a quick-acting valve 12 actuated by an electropneumatic actuator 12a. The control impulse for the valve 12 is received from a pneumatic level-sensor LS.

I claim:

1. In a loading apparatus for granular or pulverulent material including a moveable hopper having downward sloping bottom sheets adjacent an outlet and arranged to deliver material from a feedspout to a variable-position receiver, the improvement comprising de-aerating means associated with said hopper, said de-aerating means including a plurality of baffles within the hopper and positioned on downward sloping planes intersecting the plane of the downward sloping bottom sheets.

2. The loading apparatus of claim 1 in which said de-aerating means includes at least one vibrator engaging one of said downward sloping bottom sheets and said downward sloping baffles.

3. The loading apparatus of claim 1 including means for adjusting the downward slopes of said baffles.

4. The loading apparatus of claim 3 in which said adjusting means includes axles extending to the exterior of the hopper.

5. The loading apparatus of claim 1 in which at least one baffle includes two downwardly sloping sides arranged as an inverted V.

6. The loading apparatus of claim 5 in which the two downwardly sloping sides are of equal length.

7. The loading apparatus of claim 5 in which the two downwardly sloping sides are unequal in length.

8. The loading apparatus of claim 1 including a quick cut-off valve in the hopper outlet.

9. The loading apparatus of claim 8 including means for controlling said cutoff valve in response to a predetermined level of material discharged from said outlet.

10. The loading apparatus of claim 9 in which said control means includes a pneumatic sensor.

* * * * *